United States Patent
Barfield et al.

(10) Patent No.: US 10,330,494 B2
(45) Date of Patent: Jun. 25, 2019

(54) METHOD TO DETERMINE A PRESSURE NOISE METRIC FOR FALL DETECTION SYSTEMS

(71) Applicant: Verizon Patent and Licensing Inc., Basking Ridge, NJ (US)

(72) Inventors: James Ronald Barfield, Atlanta, GA (US); Stephen Christopher Welch, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 818 days.

(21) Appl. No.: 14/160,311

(22) Filed: Jan. 21, 2014

(65) Prior Publication Data
US 2014/0214353 A1    Jul. 31, 2014

Related U.S. Application Data

(60) Provisional application No. 61/756,849, filed on Jan. 25, 2013.

(51) Int. Cl.
*G01D 3/036*    (2006.01)

(52) U.S. Cl.
CPC .................... *G01D 3/036* (2013.01)

(58) Field of Classification Search
CPC ......... A61B 5/1117; A61B 5/11; A61B 5/103; A61B 2562/0219; G01D 3/036
See application file for complete search history.

(56) References Cited

U.S. PATENT DOCUMENTS

| 7,162,368 | B2 * | 1/2007 | Levi | G01C 5/06 701/300 |
| 2009/0322540 | A1 * | 12/2009 | Richardson | A61B 5/0002 340/573.7 |
| 2014/0375461 | A1 * | 12/2014 | Richardson | G08B 21/0446 340/573.7 |

OTHER PUBLICATIONS

Marie Tolkiehn et al., Direction Sensitive Fall Detection Using a Triaxial Accelerometer and a Barometric Pressure Sensor, Aug. 30, 2011, 33rd Annual International Conference of the IEEE EMBS, pp. 369-372.*

Bianchi et al., Falls Event Detection using Triaxial Accelerometry and Barometric Pressure Measurement, Sep. 2, 2009, 31st Annual International Conference of the IEEE EMBS, pp. 6111-6114.*

* cited by examiner

*Primary Examiner* — Mischita L Henson (57) ABSTRACT

A wearable fall-detection device has a variety of sensors, including a pressure sensor, that provide signals for sampling environmental conditions acting on the device. An average of pressure data samples is used to determine a resultant that may indicate an amount of noise in a pressure data signal, and statistical analysis of the noise and the pressure signal average may be used to determine a confidence estimate value that indicates a level of confidence in the amount of noise that a pressure signal is subject to, or includes. The confidence estimate and known fall data, such as change in pressure between a person standing and lying, can create a threshold function that may adapt according to sampled data thus providing a customizable (either statically or dynamically) threshold function for comparing sensor data against rather than comparing data with just a linear threshold function.

20 Claims, 6 Drawing Sheets

METHOD TO DETERMINE A PRESSURE NOISE METRIC FOR FALL DETECTION SYSTEMS

FIELD

The invention relates to determining the noise measured by a pressure, or other sensor, in particular within wearable mobile devices with wireless communication capabilities for determining and reporting a fall in an emergency event.

BRIEF DESCRIPTION OF THE DRAWINGS

FIG. 3 (a) is a plot showing the standard deviation for fall and fall-like events versus the change in pressure for those events.

FIG. 3 (b) is a plot showing the standard deviation fall and fall-like events versus the change in pressure for those events.

DETAILED DESCRIPTION

A fall detection device such as a personal, wearable device that attaches to clothing, or otherwise can be attached to a person or object, and may include wireless communication processor circuitry and global positioning satellite processor ("GPS") circuitry. In addition, the personal wearable device may include sensors and transducers, such as single, or multiple-axis, accelerometers, barometers, gyroscopes, heart rate detectors, microphones, speakers, buttons, visual display, and the like, that couple to either, or both, of the wireless communication processor circuitry and the GPS circuitry. When referring herein to either of the wireless processor circuitry or GPS processor circuitry, each typically include an integrated circuit, supporting circuitry such as ADCs and DACs, memory, power supply circuitry, discrete components, and other items such as antennas, amplifiers, buffers, registers, etc. Typically, one processor (usually the wireless communication processor) performs most of the general processing of the device in addition to its specific duties related to core function (e.g., wireless communication processing). However, processing duties may be distributed among multiple processors. For example, an auxiliary processor may handle power management for all components of the fall device, and the GPS and communication processor may handle higher level processing duties. Unless otherwise noted, reference herein to a processor means the higher level processing, which may, or may not, include a given processor's core role functionality.

Accelerometer-based fall-detection devices can be made more robust by incorporating barometric pressure measurements. Real-time pressure information can be made useful in two ways: 1) confirming that a fall has occurred (relative pressure increase), and 2) determining if user has gotten up from a fall (relative pressure decrease). Barometer data is subject to drift and high noise levels and these signals often exceed the amplitude of the signals it is desirable to capture. Fall detection efforts then stand to benefit from knowledge of the noise level in a given signal. An aspect may improve fall detection accuracy by introducing a dynamic pressure threshold based on the observed noise level in a given signal and generating a confidence estimate indicative of the reliability of sensor data.

Noise Estimation

A method that may be used to estimate the noise level in a given signal calculates the standard deviation of time-series data, and assumes that noise is proportional to standard deviation. While the approach is useful for simple noise estimation, the approach is highly sensitive to outliers, and does not capture the noise level present in a pressure signal well.

Figure 1:
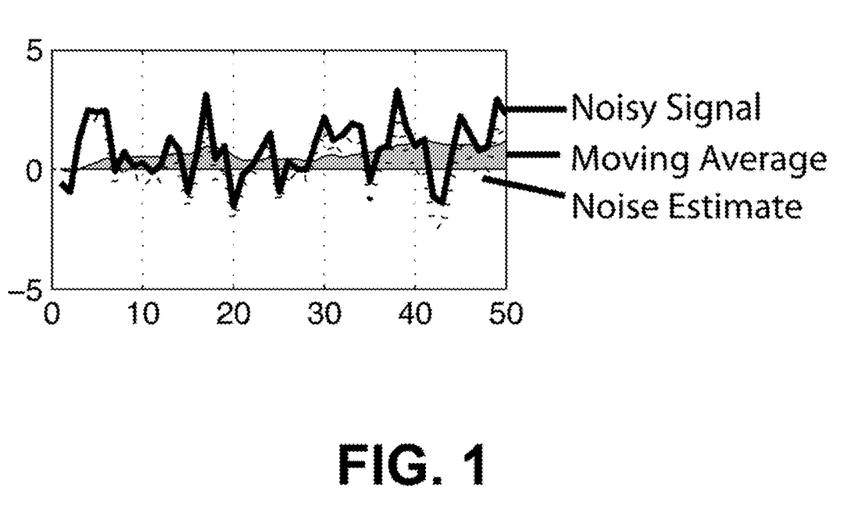
FIG. 1 shows a plot of time series of the relevant pressure signals in a method for extracting an underlying signal from a noisy signal.

FIG. 1 shows an example of a general approach to determine a noise estimate of a given signal. The noisy signal illustrated in FIG. 1 and described in EQ. 1 may be indicative of typical pressure sensor readings and is theoretically composed of two parts: 1. A low frequency component corresponding to the altitude of the device 2. High frequency information that can be attributed to numerous sources such as air currents within the space the device is measuring, erroneous sensor readings, or any other phenomena we do not wish to measure. The low frequency component of the pressure signal may indicate the relative pressure value at a particular altitude when using a measured pressure value to determine whether a fall has occurred based on a device's altitude change, and should be extracted for further evaluation (Moving Average in FIG. 1 and EQ. 1 corresponds to the low frequency component). To estimate the low frequency component, a 15 sample moving average filter may process periodically sampled pressure values from a pressure transducer to generate the Moving Average signal in FIG. 1. Other methods can be used to remove the high frequency content to generate the Moving Average signal such as using other low pass filtering techniques to reduce the noise in the Noisy Signal. The higher frequency components that represent noise in the pressure signal may be calculated as the difference between the 15 sample moving average filtered signal (Moving Average) and the raw pressure non-filtered signal (Noisy Signal). Separated spectrally, the pressure signal may be understood to be composed of the Moving Average that represents the pressure at a particular altitude (lower frequency spectral content) and the Noise Estimate (higher spectral content of the signal) to make up the Noisy Signal that are the raw values that are received from a barometric pressure sensor/transducer. EQ. 1 shows an example of a relationship between all three signals. FIG. 1 shows an example of the elements that may be generated in Method 200, shown in FIG. 2, that are used to generate a measure of noise-based metric referred to as Confidence Estimate. Noisy data are not limited to pressure signals, and the approach detailed herein may be applied to other signals where noise estimates are useful for establishing the credibility or trustworthiness of signal at a given time.

$$\text{Noisy Signal} = \text{Moving Average} + \text{Noise Estimate} \quad (EQ\ 1)$$

Noise Estimation of Pressure Signal (Confidence Estimate)

Using the rational reflected in EQ 1, a simple method to estimate the noise level in a given signal would be to calculate the standard deviation of the pressure time series, and assume that noise is proportional to standard deviation. While this approach is useful for determining how much noise is present in the signal, the approach is highly sensitive to outliers, and may not well capture noise level in a given signal. Herein, the confidence estimate is defined as an estimation of the amount of noise a pressure signal contains. Qualitatively, a low confidence estimate corresponds to a low noise pressure signal and a high confidence estimate corresponds to a noisy signal. Fall detection methods may use pressure data to establish the altitude of a device in relation to the ground by analyzing the pressure data at two instances in time (for example the time when a person is thought to be standing and the time when a person is thought to be on the ground). This pressure change between two instances of time may correspond to the described altitude change and is referred to here as Delta Pressure. The time instances at which pressure is measured to establish this metric may be controlled by an accelerometer portion of a fall-detection device algorithm, and may be defined to be before and after an acceleration impact or sensing of free-fall by an accelerometer. Other sensors may be used to control when to generate Confidence Estimate such as other barometer sensors, gyroscopes, manometers, proximity sensors, or transducers. Changes in orientation as sensed by a gyroscope or an accelerometer may be used as an indication that a fall may be occurring. Using an external metric to indicate that a fall might be occurring, a confidence estimate may be calculated in order to describe the credibility or trustworthiness of the relative pressure change measured before and after what is believed to be a fall.

Figure 2:
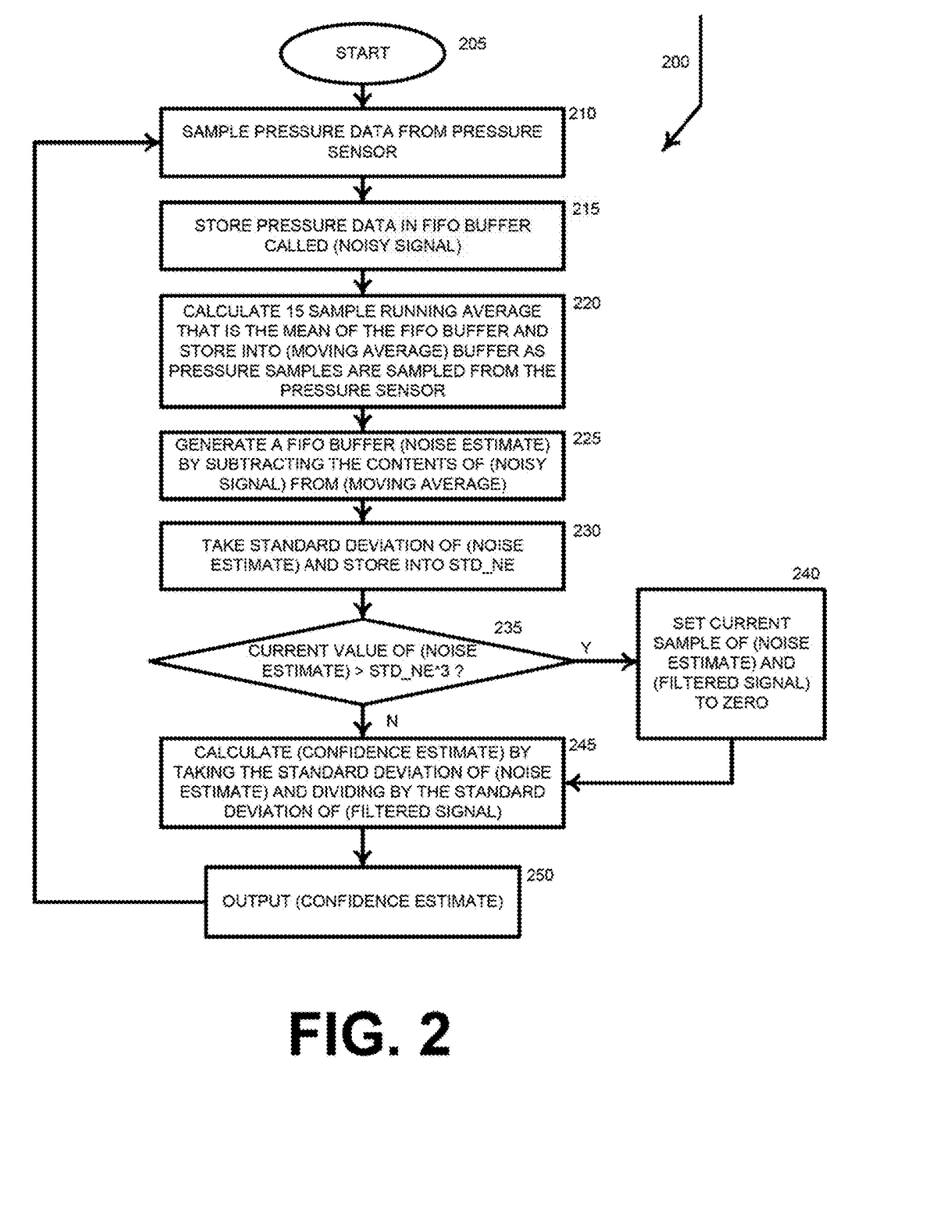
FIG. 2 illustrates an example method to determine a confidence estimate within a device indicative of the amount of noise present in the pressure signal.

FIG. 2 shows an example method 200, and specifically how the confidence estimate may be calculated along with methods for the removal of outliers on the sampled pressure data by a device. Method 200 starts at step 205 and progresses to step 210 where data is sampled (a typical pressure sample rate is 10 Hz) from a barometric pressure sensor. In step 215, the sampled pressure value may be stored in a first FIFO buffer called Noisy Signal. Although not shown in the figure, the device samples and stores pressure data until the FIFO buffer is filled. Sizes for the FIFO buffers contained in method 200 may be 15 samples in length (sample length may be different depending on application). The mean temporally corresponding to the current sample may be calculated from the current sample and the previous 14 samples of data and stored into another FIFO buffer, which may be referred to herein as a second buffer, and may also be referred to herein as Moving Average buffer, or as a filtered signal buffer. Moving Average may be a buffer containing values representing a mean filtered signal indicative of the low spectral components of the pressure signal. Method 200 maybe be delayed until the Moving Average buffer is filled with samples of pressure data before progressing to step 225. At step 225, sample values in the Noisy Signal Buffer may be subtracted sample by sample from temporally corresponding values in the Moving Average buffer to generate a resultant Noise Estimate buffer that contains high frequency content (Noise) of the values that resulted from sampling signal from the pressure sensor. At step 230, the standard deviation of the Noise Estimate buffer of data may be evaluated to eliminate outlier data samples. The standard deviation calculation may be then stored in the variable STD_NE (which represents standard deviation of noise estimate buffer). The method then progresses to step 235 and the may perform a comparison to determine whether the absolute value of the current sampled value of Noise Estimate is greater than the generated STD_NE *3 (STD_NE *3 is used for exemplary purposes and may be defined with a different scaling value other than 3) in order to check for outliers, effectively removing any values greater than three standard deviations away from determination of the signal mean stored in the second buffer. The factor of three (3) is shown as an effective value but a higher or lower factor may be chosen depending on desired sensitivity to outliers. Further, other statistical measures of spread or variance rather than standard deviation may be used.

If the method determines that an outlier has occurred, as indicated by the 'Y' path, the method may progress to step 240. In step 240, as the current value is determined to be an outlier, the method may set the current sample of Noise Estimate and Filtered Signal buffers to a value of zero. If at step 235 the current signal value is within 3 standard deviations of the mean, the current value may be determined not to be an outlier and the method may follow the 'N' path to step 245. At step 245 method 200 may perform a calculation according to a formula to determine Confidence Estimate which may be representative of the noise contained at a current sample (may correspond to the most recently stored sample in Noisy Signal) to represent the noise associated with the pressure measurement. Confidence Estimate may be calculated using EQ 2, discussed in reference to step 245, by calculating the standard deviation of the values contained in Noise Estimate buffer (third buffer), and dividing by the standard deviation of the Filtered Signal Buffer (second buffer). After this calculation is performed, the $$\text{Confidence Estimate} = \left( \frac{stdev(\text{Noise Estimate})}{stdev(\text{Filtered Signal})} \right) \quad (EQ\ 2)$$

method may progress to step 250 where the method outputs the confidence estimate to indicate the noise level of the current signal. The confidence estimate may indicate the reliability of pressure sensors for fall detection but may be used for a variety of applications such as sensor performance to eliminate improperly functioning sensors in devices, test of production reliability of pressure sensors, or reliability measurements in altimeters. After the method outputs a Confidence Estimate, the method may return to step 210 where more data may be sampled from the pressure sensor that ultimately progresses to outputting more pressure confidence estimates of the pressure signal.

Steps 230-245 are optional step in the method to measure the Confidence Estimate and provide detection of outliers in the Noisy Signal signal. The assumption may be made that outliers are independent of the rest of the signal, i.e. a high quality signal can suffer from outliers. Outliers seen within available datasets may be a result of impact events—such an event may create a large barometric pressure spike. These spikes may be informative and may be used in decision making, however, they are not indicative of ambient air pressure and may substantially bias metrics aimed at calculating changes in pressure. Thus, outliers may be removed in method 200 for the purposes of calculating a Confidence Estimate. Method 200 may be used in conjunction with multiple pressure sensors in a device or method to provide an indication of the reliability of one pressure sensor over another by relying on the pressure sensor with the best confidence estimate. Further, different types of pressures sensors or pressure sensors installed in different locations on the device may be made useful by selecting to use the sensor with the lowest noise estimate, or by blending the measurements from two or more sensors in a way that takes into account the noise level in each sensor (e.g. a weighted average)

Figure 3A:
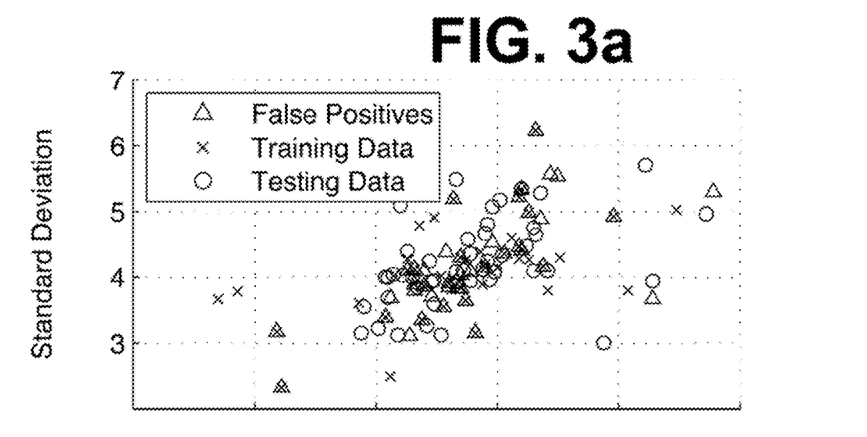
Figure 3B:
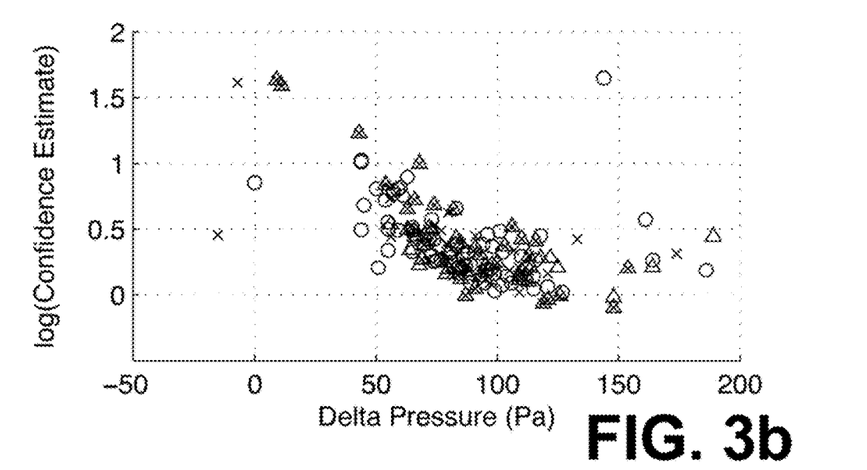

Standard Deviation Versus Confidence Estimate as a Reliability Metric for the Purposes of Fall Detection A method to calculate a confidence estimate of a pressure signal would be to simply take the standard deviation to judge the variability of the pressure signal within a predetermined amount of time. FIG. 3(a, b) are plots showing non-falls as indicated by false positives in the figure, and two categories of falls used in development: (1) training falls, and (2) testing falls collected for development fall-detection methods. The abscissa in each plot shows the measured change in pressure (Delta Pressure) before and after a fall or fall-like event. The Delta Pressure is the measurement of a fall or non-fall relative pressure change and may be calculated by taking an averaged value after an impact and subtracting the value from an averaged pressure measurement prior to impact (physically, falling persons fall from a standing position to a horizontal position on the ground, so pressure transients may occur quite quickly). The corresponding pressure when falters are in a standing position and then in a horizontal on the ground position may change from lower pressure values read by the barometer to higher values read by the barometer. The difference between these pressure values may be referred to as Delta Pressure (may also be referred to as 'delta p' or '$\Delta p$'). Standard deviation may be positively correlated with delta P metrics (shown in FIG. 3(a)), making the method of using standard deviation as a Confidence Estimate potentially less effective than the one outlined in method 200, and of limited use in classification. The Confidence Estimate may be negatively correlated with Delta Pressure (FIG. 3(b)): less noisy signals generally have higher delta P values, this trend may allow for more effective predetermining of thresholds by imposing higher pressure cut off values/criteria for signals with lower confidence estimates (less noisy), and a method that is less sensitive to false positives or noisy data can be built. In other words, the less noisy a pressure signal (the lower the noise the lower the confidence estimate value) the more likely a delta p it indicates resulted from a fall, and thus the more sensitive the criteria the fall detection algorithm can use for determining whether a pressure spike signal resulted from a true fall or from a random, non-fall event.

Calculation of Confidence Estimate for the Application of Fall Detection

Pressure Confidence Estimates may be used in the application of fall detection as a metric to determine how reliable or noisy pressure data is and may be used in conjunction with calculations of the relative change in altitude in a device to provide an indication that a fall has occurred. An accelerometer may be used to measure the acceleration observed in a device attached to a person or object and the acceleration signal it produces may be processed by numerous methods to distinguish fall from non-fall events. After the processing of one or more acceleration signals indicates that a fall may have occurred, processing signals from a pressure sensor and one or more accelerometer sensors, manometer sensors, proximity sensors, and other transducer sensors may provide indication in a variety of ways to judge that a fall has occurred. The pressure sensor may be used to sense if a person or object got back off the ground by sensing if the measured pressure decreased in a particular period of time, providing an indication that relative altitude of the sensor was increased. The calculation of Confidence Estimate from pressure data may be used to set and adjust the Delta Pressure threshold value based on the noise present. Using the calculated Confidence Estimate may provide a better indication that a person wearing a fall detection device got up from the ground than using a non-adjustable pressure threshold.

When a person falls down the relative altitude of the device may be changed and this may be indicated by a change in pressure. The pressure change is compared to a threshold value to determine if the change in altitude correlates well with a predetermined pressure change (Pressure Delta value) that may typically result from a fall event. A Confidence Estimate may be used to add another dimension to a pressure delta measurement to indicate noise in the pressure data that may measure how reliable a pressure delta measurement is for an event for consideration when classifying an event as a fall. Wearable device-based fall detection systems may satisfy the need to alert and dispatch emergency personnel in the event of potentially life threatening fall. Such efforts are made less effective by high rates of non-fall events being indicated as fall events (i.e., false positives). To lower the rate of improperly classified non-falls, reliable pressure and pressure confidence data may allow wearable devices to determine if a person has gotten back up following a fall by monitoring pressure decreases following fall events, thus lowering the non-fall misclassification rate. Effective confidence estimates may be valuable as the cost of incorrectly indicating that a fallen person has gotten up may be high.

Figure 4:
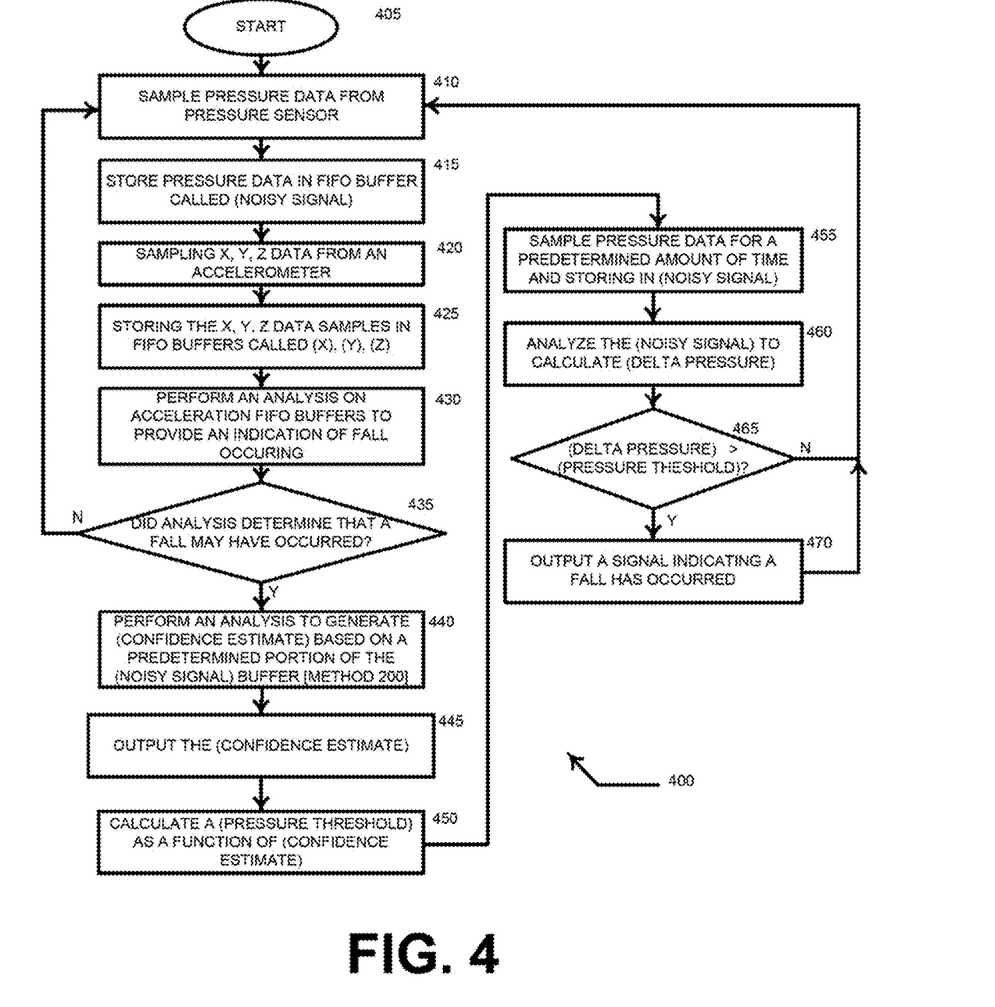
FIG. 4 illustrates an example method to determine if a fall has occurred based on pressure and accelerometer data collected that makes use of a confidence estimate in the determination of a fall or non-fall.

Shown in FIG. 4 is an example method 400 that provides a process for determining if a fall may have occurred by using a combination of a pressure sensor and an accelerometer. The method starts at step 405 and progresses to step 410 where a sample, or samples, are retrieved from a pressure sensor. An example sampling rate is 10 Hz. The sampling rate may be higher or lower depending on power or application constraints. In step 415, the method may store the pressure sample or samples in a FIFO buffer that may be used at a future point in the method. Progressing in method 400 to step 420, samples of X, Y, and Z accelerometer axis data may be retrieved from an accelerometer. An example sample rate is 50 Hz for measuring accelerometer data. In Step 425, the X, Y, and Z values may be stored in a FIFO buffer (An example buffer length would correspond to 6 seconds of data). Often in applications multiple sample sets corresponding to different instances of time may be stored in the FIFO buffers. Due to different accelerometer and barometer sampling rates, more sample sets may be added to the accelerometer FIFO buffers than the pressure buffers. For example, if the sample rates for the pressure sensor and accelerometer are 10 Hz and 50 Hz respectively, for every 1 sample of pressure data added to a pressure buffer, sets of accelerometer samples will be added. Upon starting a device containing method 400, as data is begun to be collected, enough time may be allowed to elapse in order to fill both the FIFO buffers that contain accelerometer and pressure data. This is not indicated in the method for simplicity of explanation. Full buffers may be required before step 430 for subsequent calculations to be accurate. Steps 430-435 represent a method that may analyze accelerometer X, Y, and Z signals to determine if a signal indicative of a fall has occurred. If the method determines that a fall has occurred in step 435, then the 'Y' path may be followed to step 435. If no acceleration based fall is detected, then the 'N' path may be followed and another pressure sample is iteratively retrieved by returning to method 410.

Figure 5:
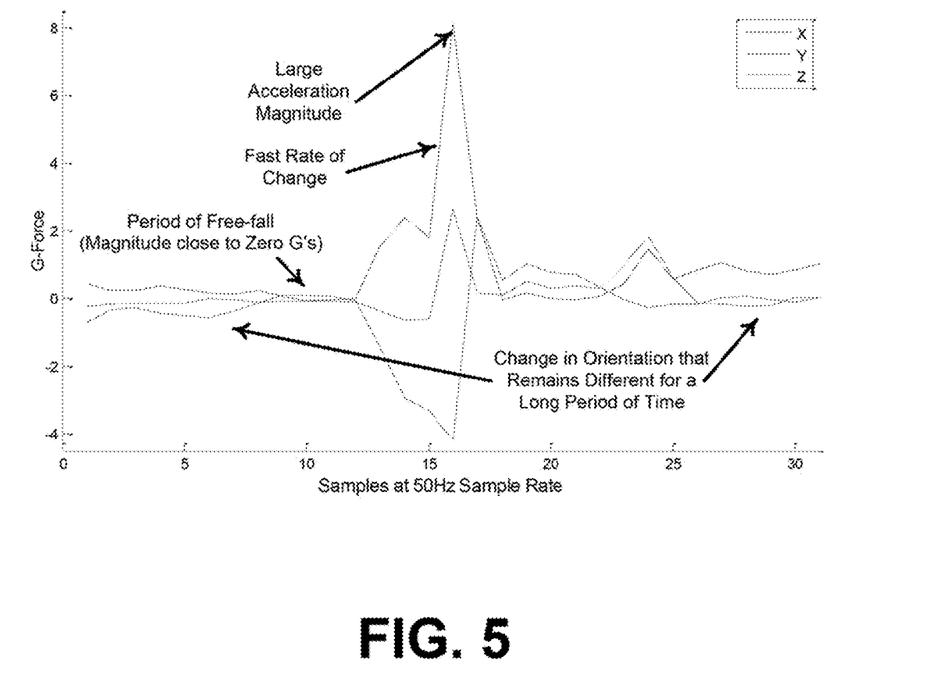
FIG. 5 is a plot showing X, Y, Z acceleration and acceleration features that may be present in a typical fall.

Step 430 may perform one or more of many potential analyses on the data. Shown in FIG. 5 is an example of acceleration data that may correspond to a typical fall where X,Y,Z indicate the acceleration in each of three mutually orthogonal directions. Methods for classifying falls based on acceleration data may include measuring changes in orientation of the accelerometer, determining a free-fall from acceleration magnitude signals, detecting large 'spikes' in the data that indicate an impact with the ground, determining the duration of the 'spike', determining the duration of the period of free-fall, measuring the standard deviation of a portion of the X, Y, Z, and/or magnitude buffers, measuring the mean of a portion of the X, Y, Z, and/or magnitude buffers, measuring the area of the 'spike' portion of the X, Y, Z, and/or magnitude buffers, area of the free-fall portion of the X, Y, Z, and/or magnitude buffers, rate of change of the 'spike' portion of the X, Y, Z, and/or magnitude buffers, rate of change of the free-fall portion of the X, Y, Z, and/or magnitude buffers, the mode of the X, Y, Z, and/or magnitude buffers, median of the X, Y, Z, and/or magnitude, minimum X, Y, Z, and/or magnitude threshold values being met, and/or peak X, Y, Z, and/or magnitude threshold values being met. One of ordinary skill will appreciate that magnitude is typically defined as the square root of the sum of the squares of the X, Y, Z acceleration data. Data-derived parameters may be used in a number of ways to determine if a fall has occurred such as simple threshold-based approaches, or more advance machine learning techniques for classification that provide tools for feature selection and threshold optimization. Not all parameters described here may be useful in machine learning-based approaches.

Method 400 at step 430 may take acceleration data and return a binary classifier: "Fall" or "Non-fall". More sophisticated methods may make use of an acceleration confidence estimate to better integrate with other parts of the overall algorithm. A number of frameworks may be used to combine multiple inputs and probabilities, such as simply taking the normalized expected value across all fall indicators, or more complex Bayesian approaches. The pressure-based confidence metric described herein may be used in conjunction with other confidence metrics from other sensors to generate an indication of a detected fall based on the measured certainty in each sensor. This method is not limited to the use of an accelerometer in conjunction with a pressure sensor, other sensors may be used such as: gyroscope(s), manometer (s), microphone(s), proximity sensor(s) in place of or in addition to an accelerometer sensor to provide further inputs for more features to distinguish falls over non-falls to be detected in the method corresponding to steps 430-435.

With a potential fall event classified by the method in step 430, step 440 may calculate a Confidence Estimate indicative of noise present in the pressure data based on the procedures defined in method 200 but using the input Noisy Signal. Because method 200 only requires 30 samples of data at 10 Hz and the FIFO buffers are of a length of 6 seconds (60 samples of data), the portion extracted in the buffer may be the data corresponding to the time at which minimal acceleration forces are present and the only force sensed by the accelerometer is gravity (Magnitude of 1 G). Thus, data may be taken from the portion of the buffer one second prior to the acceleration spike, if a spike is the defining characteristic used to indicate a fall event.

Figure 6:
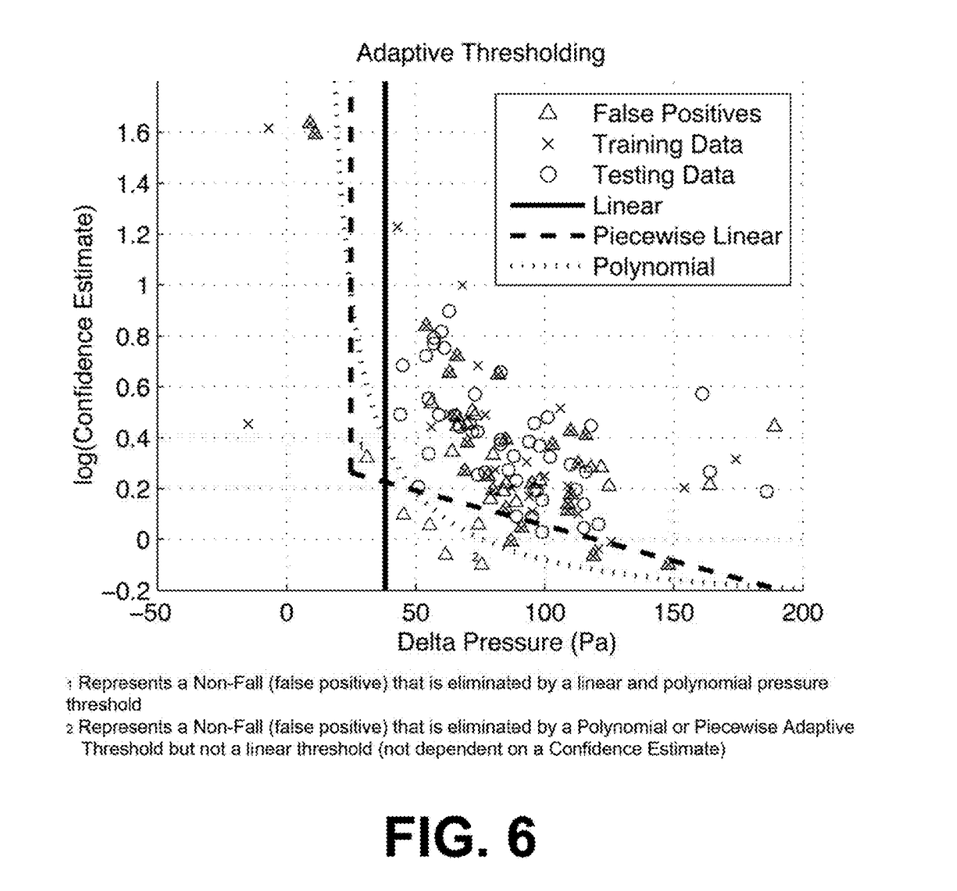
FIG. 6 is a plot showing fall and non-fall data for the purpose of determining an adaptive threshold value based on a confidence estimate to determine a delta pressure threshold value to classify a potential fall. Illustrated in the figure are linear, piecewise linear and polynomial functions to represent a full/non-fall threshold based on an input Confidence Estimate Value and Delta Pressure Value.

Step 445 may output the confidence estimate in order for sensor reliability to be available if this metric is needed elsewhere. This data may be transferred wirelessly to a cloud based system to further analyze sensor performance to improve reliability over time. Moving to Step 450, method 400 may calculate a pressure threshold based on the confidence estimate generated in step 440. Shown in FIG. 6 is an example plot of the Log of the confidence estimate versus Delta pressure for falls and false positives (i.e., non-fall events that a fall detection algorithm may have mistakenly classified as a fall event). The logarithm is used for simplified visualization and interpretation. Delta pressure and confidence estimates are shown for data collected from: non-falls with fall-like characteristics (False Positives), and two categories of recorded falls: Training and Testing. Both data types are recorded across altitude changes expected for a typical fall. Linear thresholding (i.e., directly comparing a magnitude to a threshold and if the magnitude exceeds a predetermined threshold, indicating a fall) does not rely on a confidence estimate and may generate higher error rates in the form of non-falls being detected/deemed as falls. Using a piecewise linear function or a polynomial function may allow for an adaptive threshold that is a function of the pressure confidence and the Delta Pressure value. The adaptive threshold function may be established by separating the plane into regions and fitting a higher order function to the desired dividing line. Step 450 may take the Confidence Estimate and calculate the Delta Pressure value to be used later in the method in conjunction with the adaptive threshold function determined by the region of collected fall data.

In step 455, method 400 may sample pressure data for a predetermined amount of time in order to capture pressure data after an acceleration spike or observed fall event based on accelerometer or other sensor readings. With the pressure data collected (for example, 2 seconds of data), the method may progress to step 460 where the change in pressure associated with a fall may be calculated. Step 460 may calculate delta pressure by taking the mean of the pressure signal just after the fall impact (for example, 0.5 seconds) and may subtract this value from the mean of the pressure data just prior to the acceleration spike (for example, 1 second before fall impact). In application, the mean may be taken using 15-20 pressure sample values in order to reduce the effects of outliers and sensor drift. The Delta pressure thresholds may be calculated in the same manner for the Testing and Training data in FIG. 6 to define the adaptive threshold function. With the Delta Pressure calculated, the method may compare Delta Pressure to Pressure Threshold to test that the potential fall had a large enough altitude change and corresponding Confidence Estimate. If this check is passed, the method may follow the 'Y' path to step 470 where a signal is generated to indicate that a fall has been detected by the method. If step 465 determines that the threshold condition for a fall classification is not met, the method may return to step 410 and more data may be sampled from the pressure sensor. After indicating that fall has occurred by outputting a signal, step 470 also may return to step 410.

The confidence estimate may be used in conjunction with the pressure data recorded after the device is on the ground and after a fall has been classified to have occurred by the device. After a fall event has been classified as a fall, the device may sample more pressure data in order to determine if a threshold based on changes in pressure that occur when a device increases in altitude (i.e., the corresponding pressure decreases from a relative high value to a relative low value). The pressure decrease threshold may be empirically determined from a data set that is collected from devices being on the ground then taken from the ground. Because the pressure data is subject to noise and a confidence estimate can be determined as shown in the methods herein, the confidence estimate and the change in pressure from the ground to a reasonable distance above the ground allow for the reliable determination if a device increased in altitude after a fall. Thus, the same methods may be applied to a method that senses after a fall that the device did not remain on the ground.

Returning to step 450 in method 400, the step may calculate a Delta Pressure threshold based on a Confidence Estimate, and a function may be used to perform the calculation. This calculation is referred to as adaptive thresholding and can be chosen in a number of ways. FIG. 6 shows a plot of fall and non-fall data for the determination of an adaptive threshold value based on a confidence estimate to determine a delta pressure threshold value to determine a cutoff for a potential fall. Illustrated in FIG. 6 are linear piecewise linear and polynomial functions to define the Delta pressure threshold based on an input Confidence Estimate value determined from the boundary of collected fall data in the plane of the plot. The function may be chosen based on a best fit cutoff value of the fall data collected to reduce the improperly classified non-falls and allow for more properly classified falls that are noisy based on reported confidence estimates. As shown in FIG. 6, a polynomial function may best fit this data, but a piecewise linear function may provide for a simpler implementation and can be used for thresholding purposes if it provides a better fit to other fall data collected. Using a polynomial or piecewise functions allows the threshold to be decreased when more noise is present, thus causing the detection rates to increase when more noise is present and false detection rates to decrease when less noise is present as the Delta Pressure threshold is decreased. Other methods can be used to define the boundary such as support vector machines to learn the boundary based off fall and non-fall data or neural networks to classify a fall based the delta pressure and confidence estimates for a given potential fall dataset.

Other Applications of the Confidence Estimate

The method outlined is not limited to pressure sensors and could be applied to any signal that could be subject to noise. Manometers. Accelerometers, gyroscopes, temperature sensors, pressure sensors, and transducers all could be used in conjunction with a confidence estimate to provide an indication of sensor performance.

The confidence estimate can be used to judge geographic sensor performance by measuring confidence estimates of sensors by region. As it relates to lifecycles of devices and sensors, metrics may be established based on confidence estimates as to when to recall devices no longer working or investigate the lifecycles of devices. The metrics may determine by region device performance in as it relates to humid weather or other weather metrics or performance. An example method to judge the end of life performance may be: experimentally determine the confidence estimates of the sensors using the confidence estimate method by analyzing the confidence estimate over time and determine the relationship between the confidence estimate and the time at which the sensor or device fails. Using this relationship low reliability devices can be identified with no external testing and the user can be alerted to return the device for service. Geographic constraints may also play a role in the determination of the confidence estimate as an indicator of device life for example different confidence estimates per different region would be used based on weather significance observed. Hence, device related misclassifications would be reduced. This method would not be limited to fall detection device, it could be used for any electronic device including cell phones or any device in which a lifecycle measurement is desired.

These and many other objects and advantages will be readily apparent to one skilled in the art from the foregoing specification when read in conjunction with the appended drawings. It is to be understood that the embodiments herein illustrated are examples only, and that the scope of the invention is to be defined by the claims when accorded a full range of equivalents.

What is claimed is:

1. A method, comprising:
    storing, by a device for detecting a fall event, barometric pressure data samples in a first buffer,
       the device comprising an accelerometer, and
       the barometric pressure data samples being barometric pressure data sampled from a signal generated by a barometric pressure sensor;
    storing, by the device and in a second buffer, acceleration data samples,
       the acceleration data samples being acceleration data sampled from a signal generated by the accelerometer,
          each acceleration data sample corresponding to a respective barometric pressure data sample, and
          each acceleration data sample being substantially temporally sampled with the respective barometric pressure data sample;
    determining, by the device, that a potential fall event has occurred based on a magnitude of a particular acceleration data sample exceeding a predetermined acceleration magnitude criterion;
    selecting, by the device, first barometric pressure data samples in the first buffer having a time of sampling within a predetermined period of time of a sampling of the particular acceleration data sample;
    evaluating, by the device, the first barometric pressure data samples to determine confidence estimate values associated with the first barometric pressure data samples;
    outputting, by the device, the confidence estimate values;
    calculating, by the device, a barometric pressure threshold based on the confidence estimate values;
    selecting, by the device, second barometric pressure data samples having a time of sampling during a period of time after the sampling of the particular acceleration data sample;
    determining, by the device and based on selecting the second barometric pressure data samples, a change in barometric pressure that occurred between a time before the potential fall event and a time after the potential fall event;
    comparing, by the device, the change in barometric pressure and the barometric pressure threshold to determine whether the potential fall event is the fall event; and
    outputting, by the device, a signal indicating that the potential fall event is the fall event based on the change in barometric pressure satisfying the barometric pressure threshold.

2. The method of claim 1, wherein the acceleration data samples are further generated by at least one of:
    a gyroscope,
    a manometer, or
    a proximity sensor.

3. The method of claim 1, wherein a confidence estimate value, of the confidence estimate values, is a standard deviation of the first barometric pressure data samples in the first buffer.

4. The method of claim 1, wherein determining that the potential fall event has occurred based on the magnitude of the particular acceleration data sample exceeding the predetermined acceleration magnitude criterion includes at least one of:
   determining changes in orientation of the device,
   determining a free-fall based on acceleration magnitude signals,
   determining an indication in accelerometer data that indicate an impact with a ground,
   determining a duration of the indication,
   determining a duration of a period of free-fall,
   determining a standard deviation of a portion of information associated with one or more of an X-axis, a Y-axis, a Z-axis, or magnitude buffers,
   determining a mean of the portion of the information associated with one or more of the X-axis, the Y-axis, the Z-axis, or the magnitude buffers,
   determining an area of a spike portion of the information associated with one or more of the X-axis, the Y-axis, the Z-axis, or the magnitude buffers,
   determining an area of a free-fall portion of the information associated with one or more of the X-axis, the Y-axis, the Z-axis, or the magnitude buffers,
   determining a rate of change of the spike portion of the information associated with one or more of the X-axis, the Y-axis, the Z-axis, or the magnitude buffers,
   determining a rate of change of the free-fall portion of the information associated with one or more of the X-axis, the Y-axis, the Z-axis, or the magnitude buffers,
   determining a mode of data in the information associated with one or more of the X-axis, the Y-axis, the Z-axis, or the magnitude buffers,
   determining a median of data in the information associated with one or more of the X-axis, the Y-axis, the Z-axis, or the magnitude buffers,
   determining a minimum of data in one or more X-axis, Y-axis, Z-axis, or magnitude threshold values being met, or
   determining a peak X-axis, Y-axis, Z-axis, or magnitude threshold value being met.

5. The method of claim 1, wherein a confidence estimate value corresponds to an amount of noise included in the signal generated by the barometric pressure sensor.

6. The method of claim 1, wherein the change in barometric pressure corresponds to a change in altitude of the device.

7. A device, comprising:
   a processor to:
      store, for detecting a fall event, barometric pressure data samples in a first buffer,
         the device comprising an accelerometer, and
         the barometric pressure data samples being barometric pressure data sampled from a signal generated by a barometric pressure sensor;
      store, in a second buffer, acceleration data samples,
         the acceleration data samples being acceleration data sampled from a signal generated by the accelerometer,
            each acceleration data sample corresponding to a respective barometric pressure data sample, and
            each acceleration data sample being substantially temporally sampled with the respective barometric pressure data sample;
      determine that a potential fall event has occurred based on a magnitude of a particular acceleration data sample exceeding a predetermined acceleration magnitude criterion;
      select first barometric pressure data samples in the first buffer,
         the first barometric pressure data samples having a time of sampling within a predetermined period of time of a sampling of the particular acceleration data sample;
      evaluate the first barometric pressure data samples to determine confidence estimate values associated with the first barometric pressure data samples;
      output the confidence estimate values;
      calculate a barometric pressure threshold based on the confidence estimate values;
      select second barometric pressure data samples having a time of sampling during a period of time after the sampling of the particular acceleration data sample;
      determine, based on selecting the second barometric pressure data samples, a change in barometric pressure that occurred between a time before the potential fall event and a time after the potential fall event;
      compare the change in barometric pressure and the barometric pressure threshold to determine whether the potential fall event is the fall event; and
      output a signal indicating the potential fall event is the fall event based on the change in barometric pressure satisfying the barometric pressure threshold.

8. The device of claim 7, wherein the barometric pressure threshold is derived from fall event data, and
   wherein the confidence estimate values define coefficients of the barometric pressure threshold.

9. The device of claim 7, wherein the barometric pressure threshold is based on at least one of:
   a linear function,
   a piecewise linear function, or
   a polynomial function.

10. The device of claim 8, wherein the barometric pressure threshold is derived from a barometric pressure data value corresponding to an event of a person rising from a ground to a standing position.

11. The device of claim 7, wherein a first confidence estimate value corresponds to a first amount of noise included in the signal generated by the barometric pressure sensor, and
   wherein a second confidence estimate value corresponds to a second amount of noise included in the signal generated by the barometric pressure sensor.

12. The device of claim 7, wherein the change in barometric pressure corresponds to a change in altitude of the barometric pressure sensor.

13. A non-transitory computer-readable medium storing instructions, the instructions comprising:
   one or more instructions that, when executed by one or more processors of a device, cause the one or more processors to:
      store, for detecting a fall event, barometric pressure data samples in a first buffer,
         the device comprising an accelerometer, and
         the barometric pressure data samples being barometric pressure data sampled from a signal generated by a barometric pressure sensor;
      store, in a second buffer, acceleration data samples, the acceleration data samples being acceleration data sampled from a signal generated by the accelerometer,
each acceleration data sample corresponding to a respective barometric pressure data sample, and
each acceleration data sample being substantially temporally sampled with the respective barometric pressure data sample;
determine that a potential fall event has occurred based on a magnitude of a particular acceleration data sample exceeding a predetermined acceleration magnitude criterion;
select first barometric pressure data samples in the first buffer having a time of sampling within a predetermine period of time of a sampling of the particular acceleration data sample;
evaluate the first barometric pressure data samples to determine confidence estimate values associated with the first barometric pressure data samples;
output the confidence estimate values;
calculate a barometric pressure threshold based on the confidence estimate values;
select second barometric pressure data samples having a time of sampling during a period of time after the sampling of the particular acceleration data sample;
determine, based on selecting the second barometric pressure data samples, a change in barometric pressure that occurred between a time before the potential fall event and a time after the potential fall event;
compare the change in barometric pressure and the barometric pressure threshold to determine whether the potential fall event is the fall event; and
output a signal indicating the potential fall event is the fall event based on the change in barometric pressure satisfying the barometric pressure threshold.

14. The non-transitory computer-readable medium of claim 13, wherein the acceleration data samples are further generated by at least one of:
a gyroscope,
a manometer, or
a proximity sensor.

15. The non-transitory computer-readable medium of claim 13, wherein a confidence estimate value, of the confidence estimate values, is a standard deviation of the first barometric pressure data samples in the first buffer.

16. The non-transitory computer-readable medium of claim 13, wherein the one or more instructions, that cause the one or more processors to determine that the potential fall event has occurred based on the magnitude of the particular acceleration data sample exceeding the predetermined acceleration magnitude criterion, cause the one or more processors to at least one of:
determine changes in orientation of the device,
determine a free-fall based on acceleration magnitude signals,
determine an indication in accelerometer data that indicate an impact with a ground,
determine a duration of the indication,
determine a duration of a period of free-fall,
determine a standard deviation of a portion of information associated with one or more of an X-axis, a Y-axis, a Z-axis, or magnitude buffers,
determine a mean of the portion of the information associated with one or more of the X-axis, the Y-axis, the Z-axis, or the magnitude buffers,
determine an area of a spike portion of the information associated with one or more of the X-axis, the Y-axis, the Z-axis, or the magnitude buffers,
determine an area of a free-fall portion of the information associated with one or more of the X-axis, the Y-axis, the Z-axis, or the magnitude buffers,
determine a rate of change of the spike portion of the information associated with one or more of the X-axis, the Y-axis, the Z-axis, or the magnitude buffers,
determine a rate of change of the free-fall portion of the information associated with one or more of the X-axis, the Y-axis, the Z-axis, or the magnitude buffers,
determine a mode of data in the information associated with one or more of the X-axis, the Y-axis, the Z-axis, or the magnitude buffers,
determine a median of data in the information associated with one or more of the X-axis, the Y-axis, the Z-axis, or the magnitude buffers,
determine a minimum of data in one or more X-axis, Y-axis, Z-axis, or magnitude threshold values being met, or
determine a peak X-axis, Y-axis, Z-axis, or magnitude threshold value being met.

17. The non-transitory computer-readable medium of claim 13, wherein the barometric pressure threshold is derived from fall event data, and
wherein the confidence estimate values define coefficients of the barometric pressure threshold.

18. The non-transitory computer-readable medium of claim 13, wherein the barometric pressure threshold is based on at least one of:
a linear function,
a piecewise linear function, or
a polynomial function.

19. The non-transitory computer-readable medium of claim 13 wherein the barometric pressure threshold is derived from a barometric pressure data value corresponding to an event of a person rising from a ground to a standing position.

20. The non-transitory computer-readable medium of claim 13, wherein the confidence estimate values are associated with an amount of noise included in the signal generated by the barometric pressure sensor.

* * * * *